(12) United States Patent
Kee et al.

(10) Patent No.: US 7,515,406 B2
(45) Date of Patent: Apr. 7, 2009

(54) FOLDABLE MULTI-DISPLAY APPARATUS AND METHOD THEREOF

(75) Inventors: In-seo Kee, Yongin-si (KR); Ick-hwan Ko, Yongin-si (KR); Young-gu Lee, Yongin-si (KR); Hong-shik Shim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/870,498

(22) Filed: Oct. 11, 2007

(65) Prior Publication Data

US 2008/0253073 A1 Oct. 16, 2008

(30) Foreign Application Priority Data

Apr. 16, 2007 (KR) .................. 10-2007-0037163

(51) Int. Cl.
*G06F 1/16* (2006.01)
*G09G 5/00* (2006.01)

(52) U.S. Cl. .................. 361/683; 361/681; 345/1.1

(58) Field of Classification Search .................. 345/1.1, 345/3.1, 905, 1.3, 103; 361/683, 681; 312/223.1, 312/223.2; 248/917–924; 16/284–286; 313/512
See application file for complete search history.

(56) References Cited

U.S. PATENT DOCUMENTS

| 6,115,886 | A * | 9/2000 | Fujita | 16/330 |
| 2003/0026068 | A1* | 2/2003 | Tsai et al. | 361/683 |
| 2004/0145311 | A1* | 7/2004 | Su et al. | 313/512 |

* cited by examiner

*Primary Examiner*—Jayprakash N Gandhi
*Assistant Examiner*—Nidhi Desai
(74) *Attorney, Agent, or Firm*—Cantor Colburn LLP

(57) ABSTRACT

A foldable multi-display apparatus forms a large screen by connecting housings supporting display panels in a folding manner. In the foldable multi-display apparatus, the display panels are located below a hinge axis when the display panels are unfolded. Therefore, the display panels do not contact each other during rotation of the housings with respect to the hinge axis. In this configuration, the scratching of the display panels during unfolding operations can be prevented, thereby providing the foldable multi-display apparatus with increased reliability and lifespan.

18 Claims, 9 Drawing Sheets

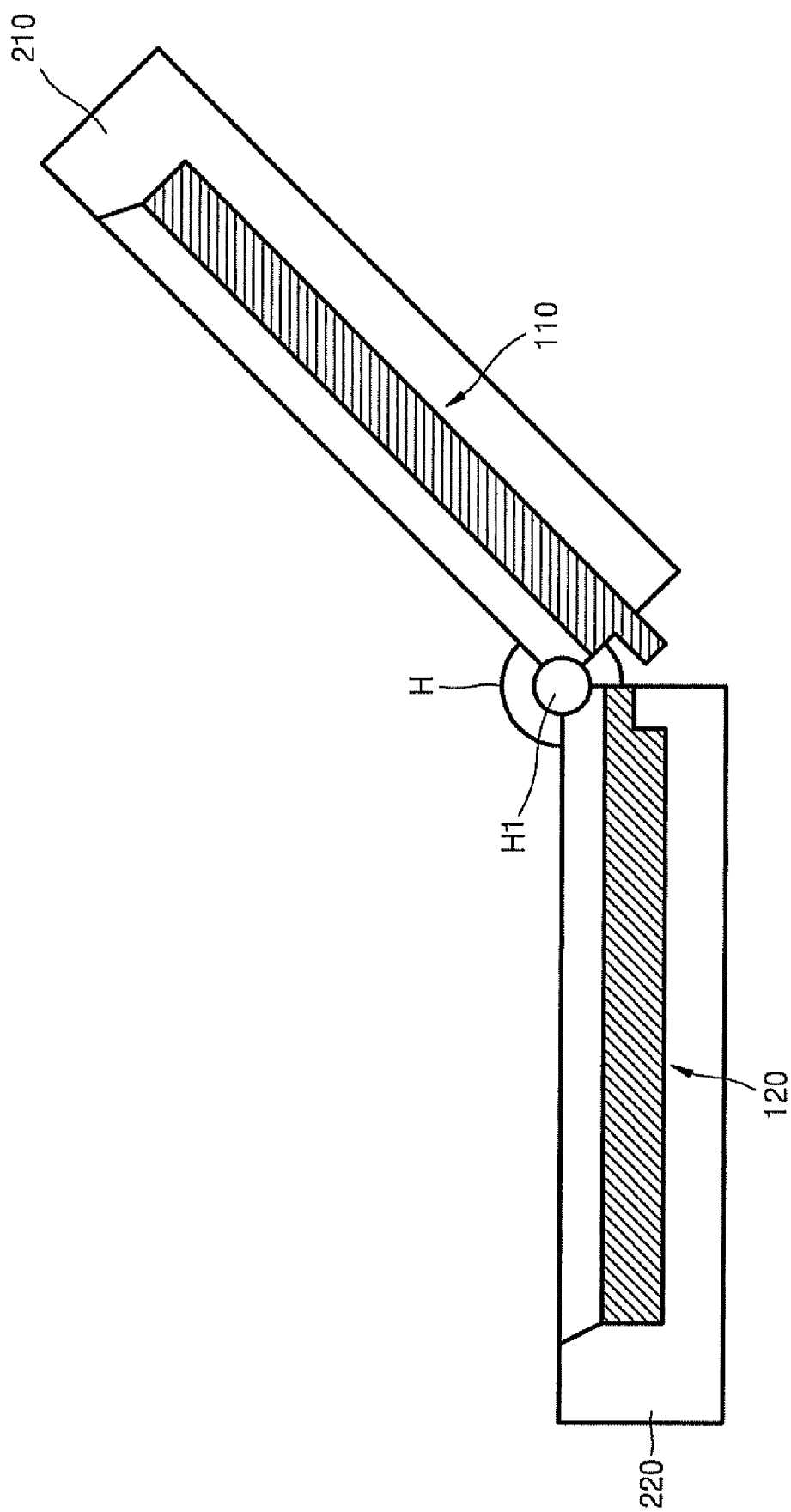

FOLDABLE MULTI-DISPLAY APPARATUS AND METHOD THEREOF

This application claims priority to Korean Patent Application No. 10-2007-0037163, filed on Apr. 16, 2007, and all the benefits accruing therefrom under 35 U.S.C. §119, the contents of which in its entirety are herein incorporated by reference.

BACKGROUND OF THE INVENTION

1. Field of the Invention

The present invention relates to a foldable multi-display apparatus that forms a large screen by connecting a plurality of foldable panels and a method thereof, and more particularly, to a foldable multi-display apparatus having increased reliability and lifespan, and a method thereof.

2. Description of the Related Art

Generally, multi-display apparatuses form a large screen by connecting a plurality of display panels. In the past, a large screen was realized by connecting a plurality of Braun Tubes, also known as cathode ray tubes ("CRTs"), into a large TV. However, recently, due to increasing demands for large screens in small mobile apparatuses such as mobile phones or personal digital assistants ("PDAs"), apparatuses that form a large screen by connecting flat panel displays, such as liquid crystal displays ("LCDs"), field emission displays ("FEDs"), plasma display panels ("PDPs"), and organic light-emitting diodes ("OLEDs") are being produced.

In a conventional multi-display apparatus, as depicted in FIG. 1, two flat display panels 10 are connected in a folding type manner, that is, the flat display panels 10 are connected so as to be able to fold and unfold with respect to a hinge axis H supported by a housing 20. Thus, when carrying the multi-display apparatus, the two flat display panels 10 are folded, and when it is necessary to use the multi-display apparatus, the two flat display panels 10 are unfolded to form one screen as depicted in FIG. 1.

When the two display panels 10 are unfolded, a seam between the two display panels 10 collide between two end parts of the display panels 10. That is, the two display panels 10 must contact each other as tight as possible when the two display panels 10 are unfolded to display a smooth image, and thus, the two end parts of the display panels 10 contact each other before they are completely unfolded.

Conventionally, as depicted in FIG. 2, the display panel 10 has a structure in which a display device 12 is installed on a substrate 11, and a cover 13 having an encapsulation member covers the display device 12. The substrate 11 and the cover 13 are formed of a material having high hardness.

BRIEF SUMMARY OF THE INVENTION

When the end parts of display panels of a conventional multi-display apparatus contact each other during a folding or unfolding operation, the display panels wear away by scratching each other during rotation operations. Severe wear and damage to the display panels, including the substrate and cover of the display panels, can occur during repeated scratching of the display panels due to collision with each other.

The present invention provides a foldable multi-display apparatus that can prevent the contact between display panels during unfolding operations.

The present invention also provides a method of preventing contact between display panels of a multi-display apparatus during an unfolding operation.

According to exemplary embodiments of the present invention, a foldable multi-display apparatus forms a large screen by connecting display panels in a folding and unfolding manner with respect to a hinge that connects housings supporting the display panels, the hinge having a hinge axis passing through a central portion of the hinge, wherein the display panels are located below the hinge axis when the display panels are unfolded so that a contact does not occur between the display panels when the housings rotate with respect to the hinge axis.

A cam structure within the hinge may include first and second cam members which are installed on first and second housings, respectively, along the hinge axis and include cam surfaces contacting each other, and an elastic member that provides an elastic force in a direction for tightly contacting the cam surfaces to each other, wherein the cam surfaces have a profile such that the elastic member provides an automatic opening or closing force on the cam surfaces when the hinge axis rotates by about 60 to about 90° in an unfolding direction.

The display panels may be disposed to have a step difference in an unfolded state, so that images displayed on display devices within the display panels are seen as if they are connected.

According to other exemplary embodiments of the present invention, a method of reducing wearing of display panels of a foldable multi-display apparatus during unfolding operations of the display panels, includes connecting the display panels in a folding and unfolding manner with respect to a hinge that connects housings supporting the display panels, the hinge having a hinge axis passing through a central portion of the hinge, and locating the display panels below the hinge axis when the display panels are unfolded so that a contact does not occur between the display panels when the housings rotate with respect to the hinge axis.

BRIEF DESCRIPTION OF THE DRAWINGS

The above and other features and advantages of the present invention will become more apparent by describing in detail exemplary embodiments thereof with reference to the attached drawings in which:

FIGS. 4A through 4F are side views showing an operation of unfolding the exemplary foldable multi-display apparatus of FIG. 3 from a folding state, according to an exemplary embodiment of the present invention;

DETAILED DESCRIPTION OF THE INVENTION

Figure 1:
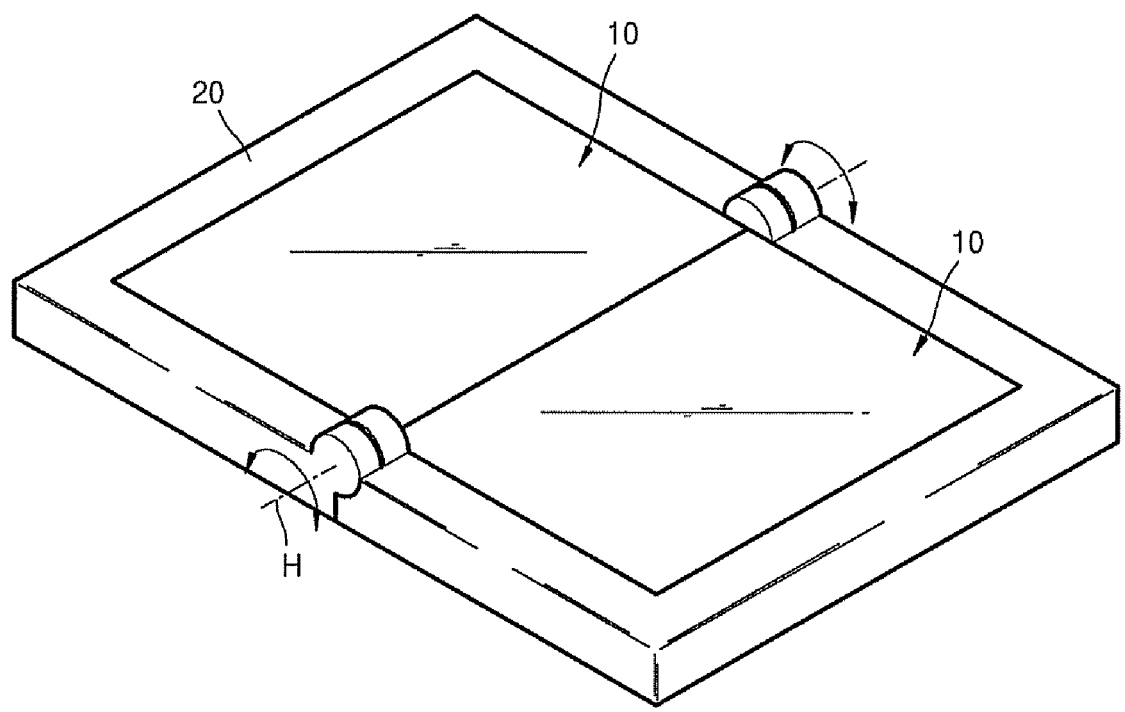
FIG. 1 is a perspective view of a conventional foldable multi-display apparatus of the prior art.
Figure 2:
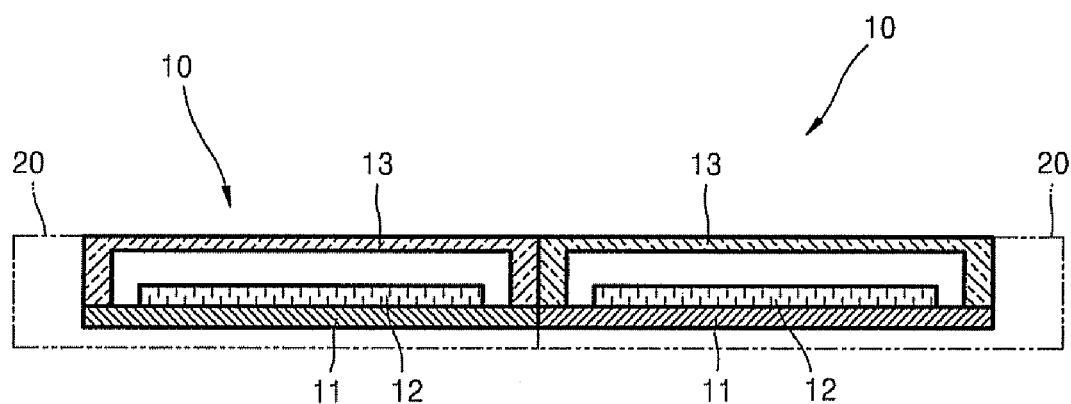
FIG. 2 is a cross-sectional view of a structure of a display panel of the prior art employed in the foldable multi-display apparatus of FIG. 1.

The present invention will now be described more fully with reference to the accompanying drawings in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

FIGS. 3 through 5C are drawings of an exemplary foldable multi-display apparatus according to an exemplary embodiment of the present invention. The foldable multi-display apparatus can be formed by connecting a plurality of display panels in various ways, such as a multi-display apparatus formed by connecting more than two display panels. However, in the present exemplary embodiment, for convenience of explanation, the connection of two unit display panels 110 and 120 will be described. Also, a simplified form of display devices 112 and 122 that display an image is depicted.

Figure 3:
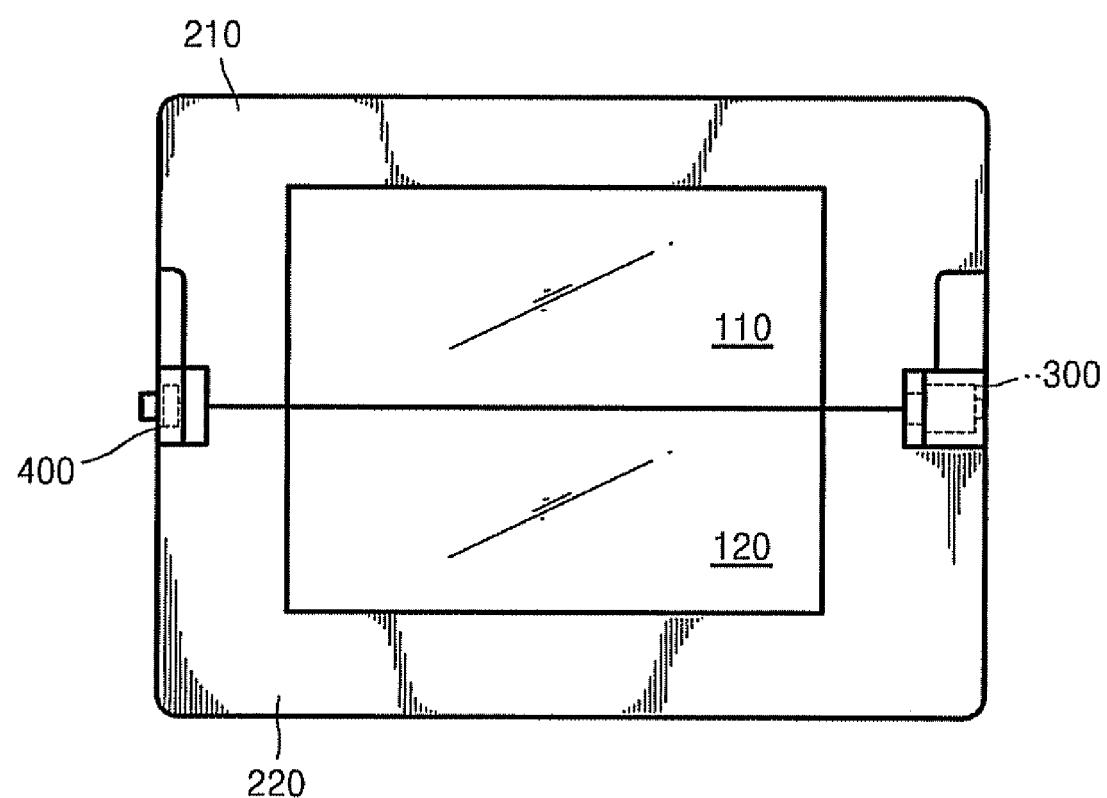
FIG. 3 is a plan view of an exemplary foldable multi-display apparatus according to an exemplary embodiment of the present invention.

Referring to FIG. 3, housings 210 and 220 which respectively support the unit display panels 110 and 120 are coupled to be able to be folded and unfolded with respect to a hinge axis H1 passing through a central portion of a hinge H. A cam structure 300 is built within the hinge H. The hinge H also includes a bearing 400 that supports the hinge H to be smoothly rotated during folding and unfolding operations of the unit display panels 110 and 120. The cam structure 300 will be further described below.

Figure 4A:
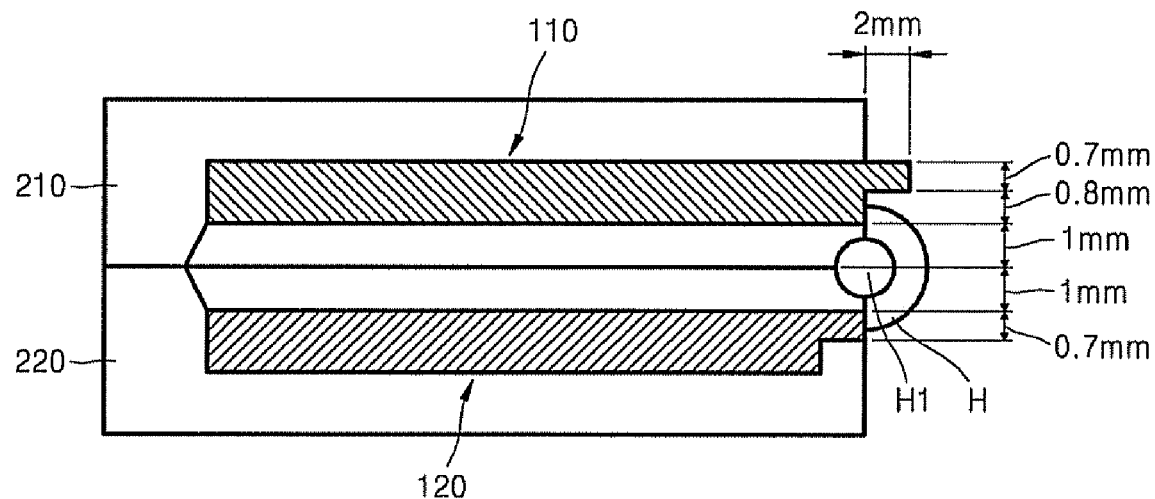
Figure 4B:
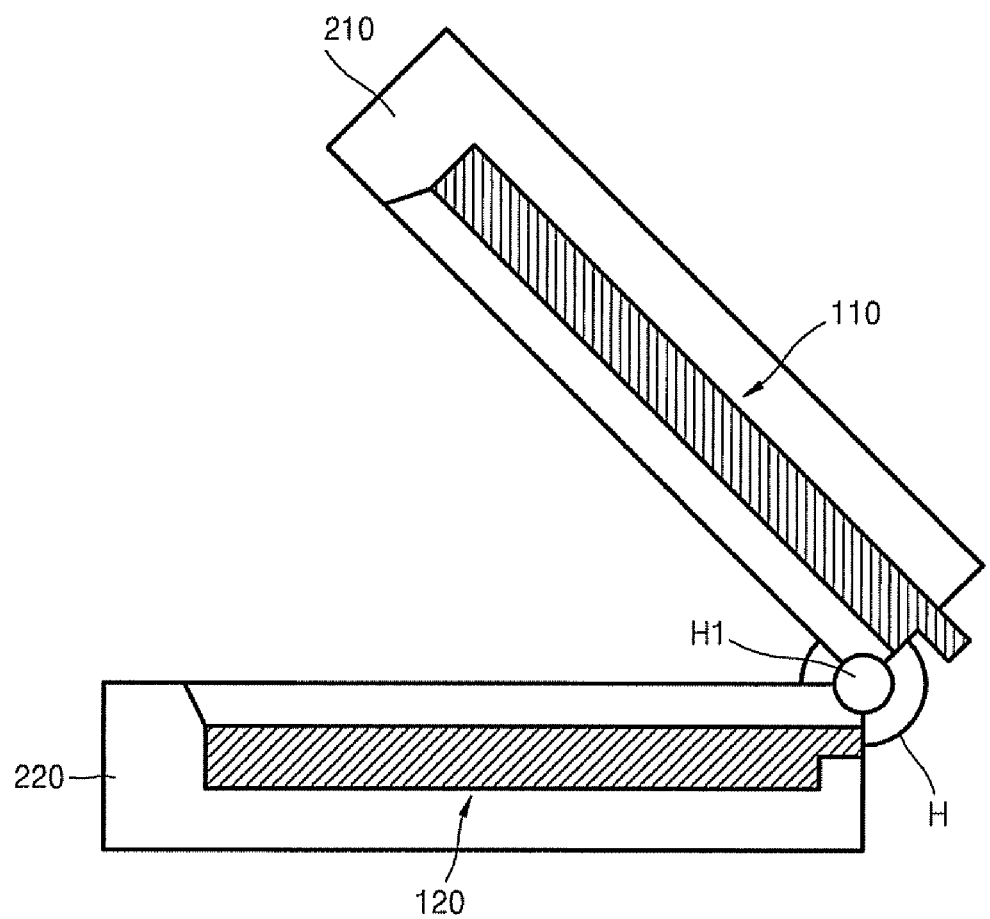
Figure 4C:
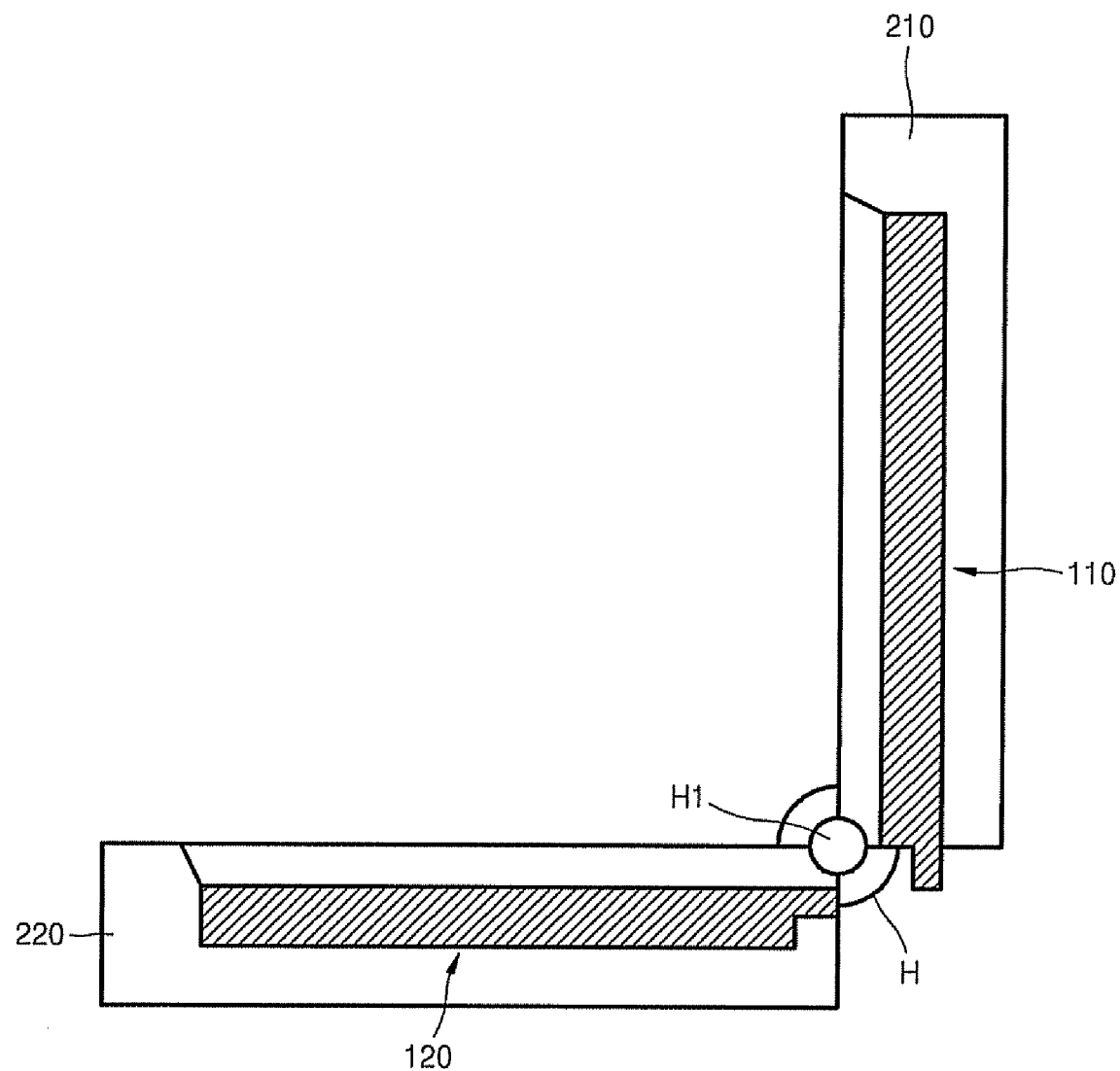
Figure 4E:
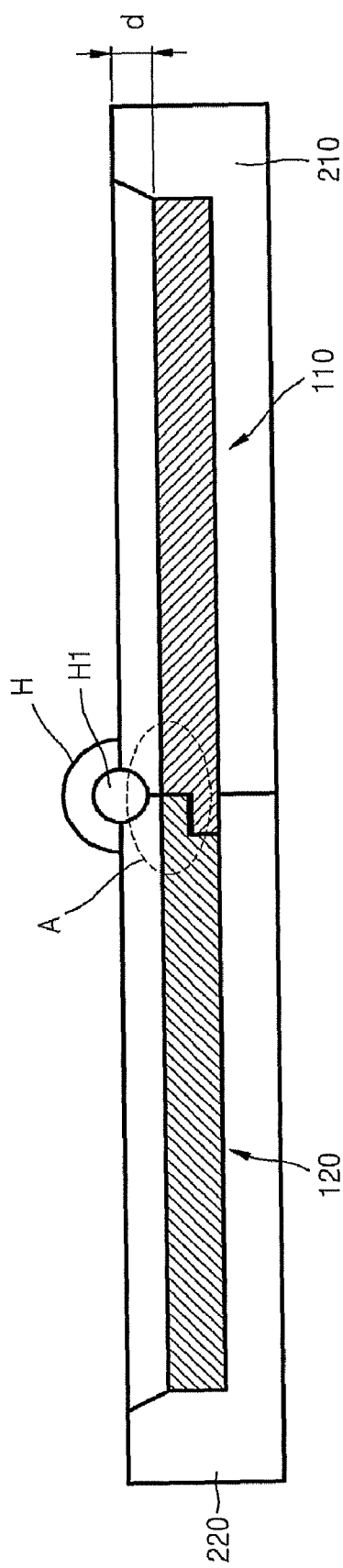
Figure 4F:
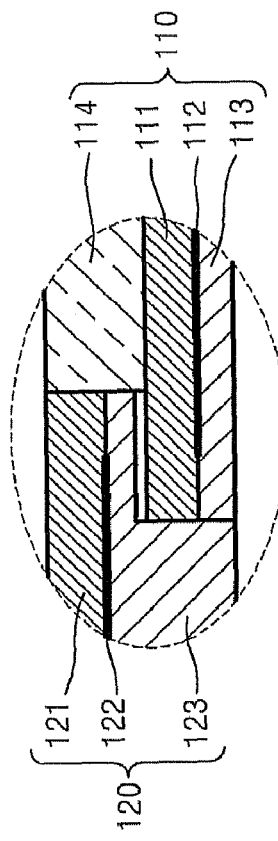

As shown in FIG. 4F, which is a magnified view of portion A of FIG. 4E, each of the unit display panels 110 and 120 has a main body structure in which the display devices 112 and 122 for displaying images are stacked on substrates 111 and 121, and encapsulation members 113 and 123 cover the display devices 112 and 122, respectively. The encapsulation members 113 and 123 can be cover glasses or thin film sealing members in which organic material layers and inorganic material layers are alternately stacked to cover the display devices 112 and 122, respectively.

The two unit display panels 110 and 120 having the above structure form a multi-screen by being connected in a foldable manner so that they can be folded and unfolded with respect to the hinge axis H1. When the foldable multi-display apparatus is unfolded, the two unit display panels 110 and 120 have a step difference as depicted in FIGS. 4E and 4F. In other words, end portions of the unit display panels 110 and 120 overlap each other such that corresponding end portions of the display devices 112 and 122 are aligned or slightly overlapped. This structure is to make an image displayed on the unit display panels 110 and 120 look continuous as if the unit display panels 110 and 120 are smoothly connected by overlapping boundaries of the two display devices 112 and 122, when the image is seen from above the seam of the two unit display panels 110 and 120. For this purpose, an end of the unit display panel 110, or at least a portion of the end of the unit display panel 110 that faces an end of the unit display panel 120, protrudes about 0.1 mm to about 5 cm outside of the housing 210, and the end of the unit display panel 120, or at least a portion of the end of the unit display panel 120 that faces and end of the unit display panel 110, is formed in the housing 220, such as by a distance corresponding to the protruding portion of the unit display panel 110. The dimensions in FIG. 4A are exemplary. When the foldable multi-display apparatus is unfolded, as depicted in FIGS. 4E and 4F, the protruded portion of the unit display panel 110 and the concave portion of the unit display panel 120 are combined with each other, and thus, the unit display panels 110 and 120 are combined with the step difference.

Reference numeral 114 indicates a plate, such as a transparent plastic plate, to match the upper surfaces of the two unit display panels 110 and 120 with each other. In the present embodiment, it is regarded that the transparent plastic plate 114 is integrally formed with the unit display panel 110. However, the transparent plastic plate 114 is not a requisite element for constituting the unit display panel 110. The present invention provides a method of preventing contact between the two unit display panels 110 and 120 during unfolding operations, and the transparent plastic plate 114 is one part of the unit display panels 110 and 120 between which the contact is to be prevented, and thus, the description of the present embodiment is made regarding the transparent plastic plate 114 as one part of the unit display panels 110 and 120.

In an exemplary embodiment, the plate 114 of the unit display panel 110 does not include the protruding portion, and the plate 114 may include an end portion that faces the unit display panel 120 in an unfolded configuration and which may be substantially aligned with an end portion of the housing 210. Also in an exemplary embodiment, the concave portion of the unit display panel 120 may be formed in the encapsulation member 123. The end portion of the encapsulation member 123 may include a first portion which is aligned with the substrate 121 as well as the housing 220 and a second portion, the concave portion, which is indented from the first portion.

As described above, the housings 210 and 220 that support the unit display panels 110 and 120 are configured so as to be able to be folded and unfolded with respect to the hinge H. When the housings 210 and 220 are folded, as depicted in FIG. 4A, the two unit display panels 110 and 120 are parallel to each other and face each other. That is, all parts of the two unit display panels 110 and 120 including portions of hinge H are parallel to each other to be separated from each other and face each other. However, when the two unit display panels 110 and 120 are completely unfolded as depicted in FIGS. 4E and 4F, end parts of the two unit display panels 110 and 120 contact each other. Accordingly, the two unit display panels 110 and 120 do not contact during rotation for folding or unfolding of the two unit display panels 110 and 120, however, as depicted in FIGS. 4E and 4F, when the two unit display panels 110 and 120 are completely unfolded, the end parts of the two unit display panels 110 and 120 contact each other. Thus, the scratching due to contact is prevented during folding or unfolding operations of the two unit display panels 110 and 120.

In order to prevent contact during the rotation operation of the two unit display panels 110 and 120, the two unit display panels 110 and 120 must be located below the hinge axis H1 of the center portion of the hinge H when the two unit display panels 110 and 120 are completely unfolded, as depicted in FIG. 4E. In this way, during the rotation operation of the two housings 210 and 220, the two unit display panels 110 and 120 do not contact each other, and thus, scratching of the two unit display panels 110 and 120 can be prevented.

Figure 4G:
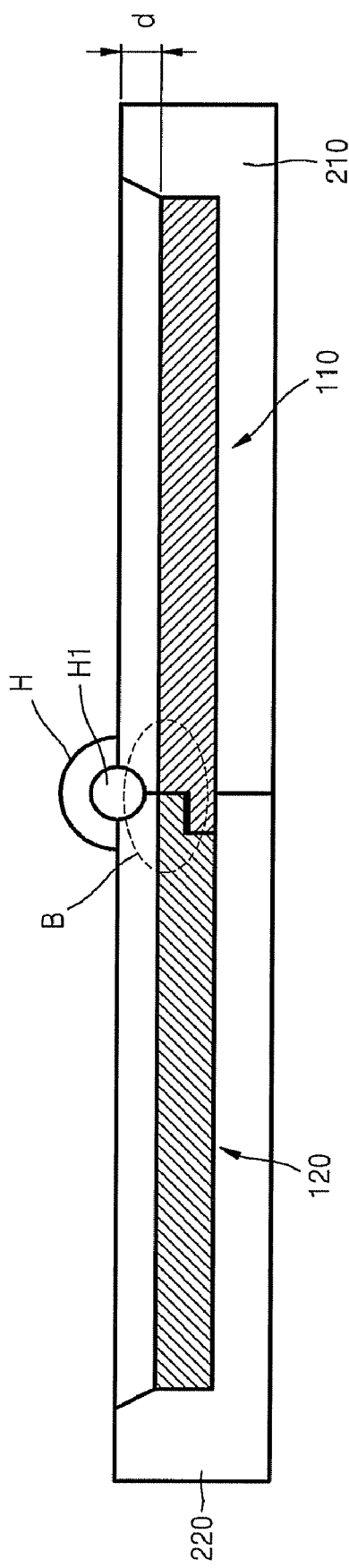
FIGS. 4G and 4H are side views of a modified version of the exemplary display panel of FIGS. 4E and 4F, according to an exemplary embodiment of the present invention; and, FIGS. 5A through 5C are schematic views sequentially showing an operation of an exemplary cam structure built in the exemplary foldable multi-display apparatus of FIG. 3, according to an exemplary embodiment of the present invention.
Figure 4H:
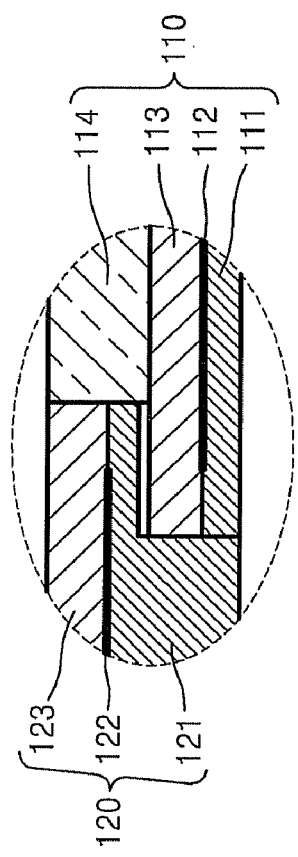

As depicted in FIGS. 4E and 4F, a bottom emission type display panel in which light generated from the display devices 112 and 122 is emitted through the substrates 111 and 121 is shown as an example of the unit display panels 110 and 120. However, as depicted in FIGS. 4G and 4H, the unit display panels 110 and 120 can alternatively be top emission type display panels in which light is emitted through the encapsulation members 113 and 123, respectively. In this case, an end portion of the substrate 121 may include a first portion facing the plate 114 and aligned with the encapsulation member 123, and a second portion, the concave portion, indented from the first portion.

The hinge H includes the cam structure 300 for automatically folding and unfolding the two unit display panels 110 and 120 to a certain angle after the two unit display panels 110 and 120 are manually rotated to a predetermined angle when opening and closing operations, that is, folding and unfolding operations of the two unit display panels 110 and 120, are performed. The cam structure 300 facilitates the opening of the two unit display panels 110 and 120 such that when the user manually opens the housings 210 and 220 of the two unit display panels 110 and 120, respectively, to an angle of about 60 to about 90° from a folding state, the two unit display panels 110 and 120 are further automatically opened to 180°.

Figure 5A:
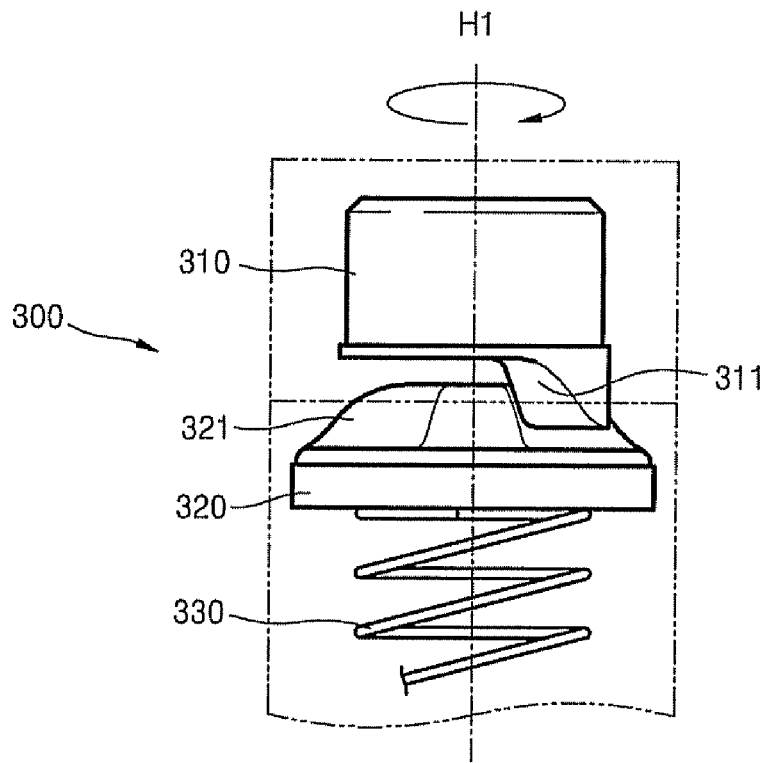
Figure 5B:
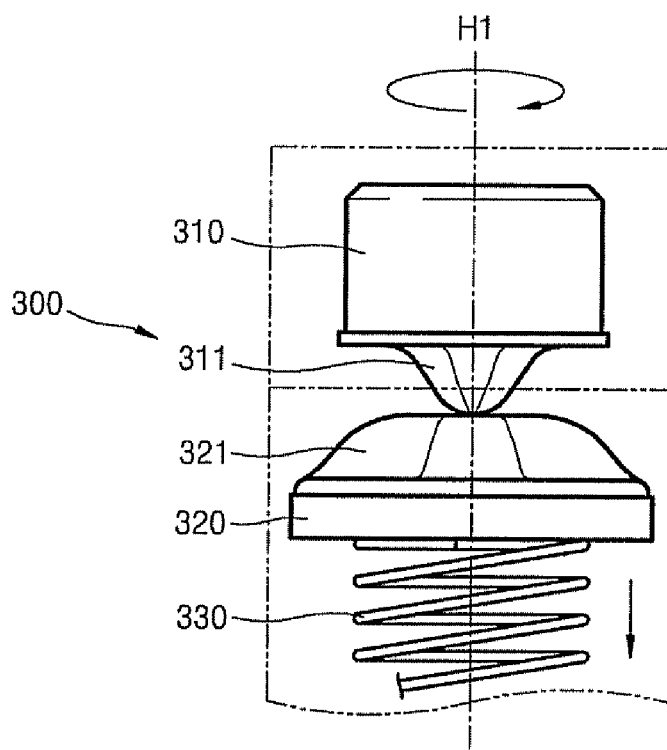
Figure 5C:
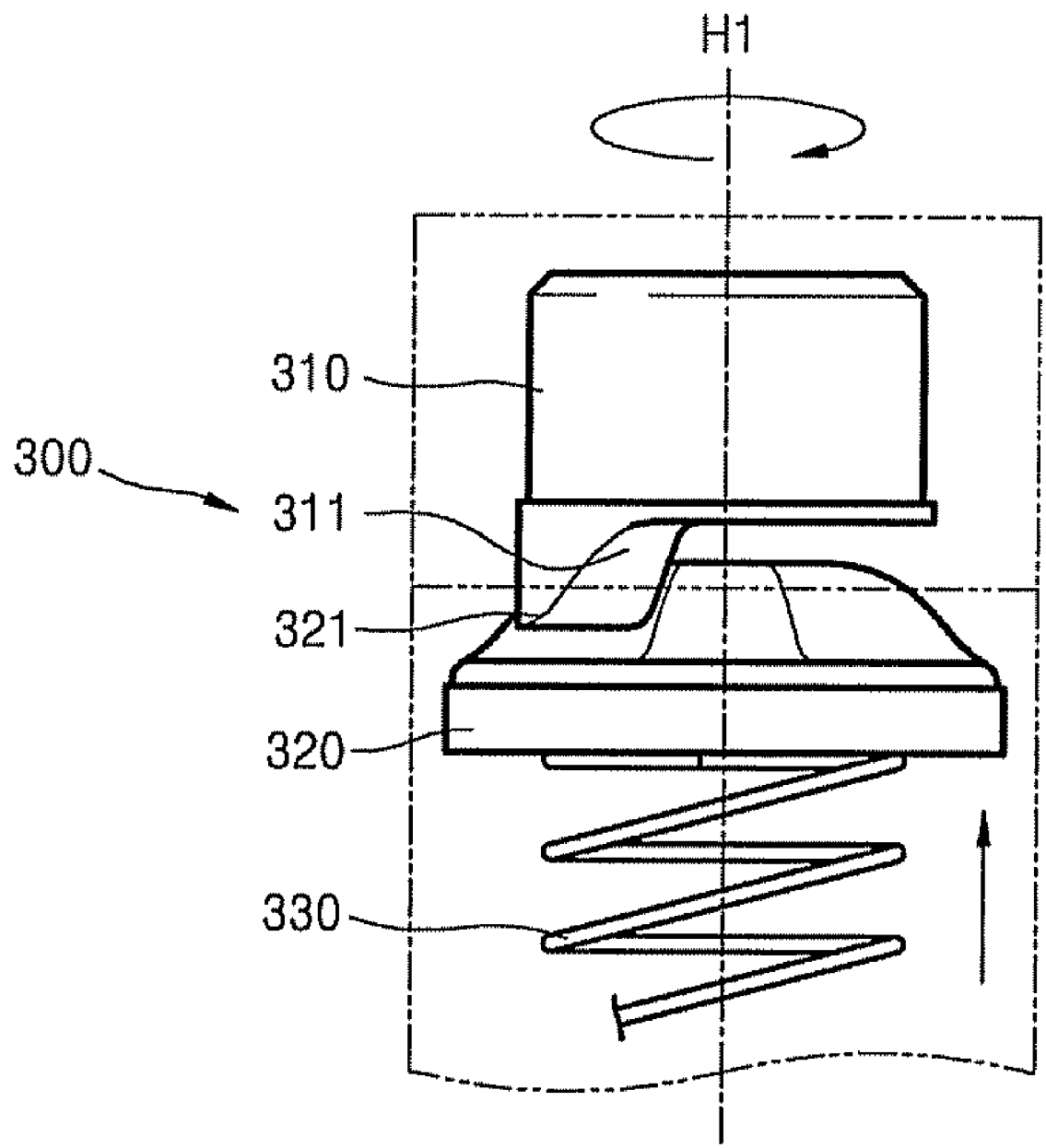

Referring to FIGS. 5A through 5C, the cam structure 300 includes first and second cam members 310 and 320 and a spring 330. The first and second cam members 310 and 320 are respectively installed on portions of the corresponding two unit display panels 110 and 120 that constitute the hinge H, and the spring 330 applies an elastic force to the second cam member 320 in a direction towards the first cam member 310 for tightly contacting cam surfaces 311 and 321 to each other. The cam surfaces 311 and 321 of the first and second cam members 310 and 320, respectively, have a profile that when the two unit display panels 110 and 120 are opened about 60 to about 90° in a direction from the folding state to the unfolding state, the two unit display panels 110 and 120 are unfolded to 180° due to the elastic force of the spring 330 that acts on the second cam member 320. In the exemplary embodiment, the cam surfaces 311 and 321 have curved surfaces that contact each other. However, one side of the cam surfaces 311 and 321 can protrude and the other side can be a curved surface, or the cam surfaces 311 and 321 can have any shape in other exemplary embodiments as long as they can provide an elastic force beyond a desired angle.

In the configuration described above, in a folding state when the housings 210 and 220 are folded, as depicted in FIG. 4A, the two unit display panels 110 and 120 are parallel to each other and face each other. At this point, as depicted in FIG. 5A, the cam structure 300 is in a state where the cam surfaces 311 and 321 of the first and second cam members 310 and 320 contact each other.

When an unfolding operation starts, the cam surface 311 pushes against the cam surface 321 such that the spring 330 compresses as indicated by the arrow shown in FIG. 5B. Then, when the rotation angle exceeds about 60° (for example, the cam surfaces 311 and 321 are designed to provide the elastic force at an angle of about 60° or higher), as depicted in FIG. 5B, an abrupt rotation is performed along the cam surfaces 311 and 321 of the first and second cam members 310 and 320 due to the restoration force of the compressed spring 330.

Accordingly, as depicted in FIG. 5C, with the spring 330 pushing the second cam member 320 back towards the first cam member 310 as shown by the arrow, the first and second cam members 310 and 320 rotate by 180° from the initial location, the two housings 210 and 220 are completely unfolded as depicted in FIG. 4E through the processes of FIGS. 4C and 4D, and hence, the two unit display panels 110 and 120 tightly contact each other. In this state, boundaries of the display devices 112 and 122 of the two unit display panels 110 and 120 are aligned, and thus, a connected image can be viewed. At this point, the two unit display panels 110 and 120 are located below the hinge axis H1 of the hinge H with a gap of d, as shown in FIG. 4E.

The folding operation is a reversed operation of the unfolding operation.

As described above, the two unit display panels 110 and 120 do not contact each other until the folded housings 210 and 220 are not completely unfolded. Therefore, damage by scratching does not occur during the unfolding operation of the two unit display panels 110 and 120.

The display devices 112 and 122 described above can be any flat panel display devices such as liquid crystal displays ("LCDs"), field emission displays ("FEDs"), plasma display panels ("PDPs"), or organic light-emitting diodes ("OLEDs").

A foldable multi-display apparatus according to the present invention can reduce wearing of panels due to contact during folding and unfolding operations of the panels and prevent the scratching of unit display panels during unfolding operations, thereby having increased reliability and lifespan.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A foldable multi-display apparatus that forms a large screen by connecting display panels in a folding and unfolding manner with respect to a hinge that connects housings supporting the display panels, the hinge having a hinge axis passing through a central portion of the hinge,
   wherein the display panels are located below the hinge axis when the display panels are unfolded so that a contact does not occur between the display panels when the housings rotate with respect to the hinge axis' and
   wherein an end of a first display panel among the display panels includes a protruding portion and an end of a second display panel among the display panels includes a concave portion, and the first and second display panels overlap when the display panels are unfolded.

2. The foldable multi-display apparatus of claim 1, wherein a length of the protruding portion is about 0.1 mm to about 5 cm.

3. The foldable multi-display apparatus of claim 1, wherein each of the display panels includes a substrate, a display device, and an encapsulation member, and the concave portion of the second display panel is formed in the encapsulation member of the second display panel.

4. The foldable multi-display apparatus of claim 3, wherein each of the display panels is a bottom emission type display panel in which light is emitted through the substrate.

5. The foldable multi-display apparatus of claim 1, wherein each of the display panels includes a substrate, a display device, and an encapsulation member, and the concave portion of the second display panel is formed in the substrate of the second display panel.

6. The foldable multi-display apparatus of claim 5, wherein each of the display panels is a top emission type display panel in which light is emitted through the substrate.

7. The foldable multi-display apparatus of claim 1, wherein the protruding portion of the first display panel protrudes from the housing of the first display panel.

8. The foldable multi-display apparatus of claim 1, wherein the hinge comprises a cam structure that allows the display panels to tightly contact each other by elastically rotating to a remaining angle to be completely unfolded when the housings are manually opened to a predetermined angle.

9. The foldable multi-display apparatus of claim 8, wherein the cam structure comprises:
   first and second cam members which are installed on first and second housings, respectively, along the hinge axis and include cam surfaces contacting each other; and
   an elastic member that provides an elastic force in a direction for tightly contacting the cam surfaces to each other,
   wherein the cam surfaces have a profile such that the elastic member provides an automatic opening or closing force on the cam surfaces when the hinge axis rotates by about 60 to about 90° in an unfolding direction.

10. The foldable multi-display apparatus of claim 1, wherein the display panels are disposed with a step difference in an unfolded state, so that images displayed on display devices within the display panels are seen as if they are connected.

11. The foldable multi-display apparatus of claim 1, wherein a display device built in each of the display panels includes one of a liquid crystal display, a field emission display, a plasma display panel, and an organic light-emitting diode.

12. The foldable multi-display apparatus of claim 1, wherein each of the display panels has a structure in which a substrate, a display device, and an encapsulation member are stacked, and each of the display panels is a bottom emission type display panel in which light is emitted through the substrate.

13. The foldable multi-display apparatus of claim 1, wherein each of the display panels has a structure in which a substrate, a display device, and an encapsulation member are stacked, and each of the display panels is a top emission type display panel in which light is emitted through the encapsulation member.

14. The foldable multi-display apparatus of claim 1, wherein each of the display panels has a structure in which a substrate, a display device, and an encapsulation member are stacked, and the encapsulation member has one structure selected from a thin film encapsulation structure in which organic material layers and inorganic material layers are repeatedly stacked on the display device and a cover glass encapsulation structure in which the display device is covered by a cover glass.

15. The foldable multi-display apparatus of claim 1, wherein the display panels form a substantially planar surface in an unfolded configuration of the multi-display apparatus, and a gap is formed between the hinge axis and the substantially planar surface in the unfolded configuration.

16. A method of reducing wearing of display panels of a foldable multi-display apparatus during unfolding operations of the display panels, the method comprising:
   providing an end of a first display panel among the display panels with a protruding portion and an end of a second display panel among the display panels with a concave portion, and overlapping the first and second display panels when the display panels are unfolded
   connecting the display panels in a folding and unfolding manner with respect to a hinge that connects housings supporting the display panels, the hinge having a hinge axis passing through a central portion of the hinge, and
   locating the display panels below the hinge axis when the display panels are unfolded so that a contact does not occur between the display panels when the housings rotate with respect to the hinge axis.

17. The method of claim 16, wherein providing an end of the first display panel among the display panels with a protruding portion includes protruding the protruding portion of the first display panel from the housing of the first display panel.

18. The method of claim 16, wherein providing an end of the second display panel among the display panels with a concave portion includes providing an indentation in one of a substrate and an encapsulation member of the second display panel.

* * * * *